3,230,264
REACTION OF CARBONYL FLUORIDE
WITH FLUORINE
Roger S. Porter, Orinda, Calif., and George H. Cady, Seattle, Wash., assignors, by mesne assignments, to the United States of America as represented by the Secretary of the Navy
No Drawing. Filed Nov. 29, 1962, Ser. No. 241,089
4 Claims. (Cl. 260—610)

This application is a continuation-in-part of our copending application Serial Number 838,389, filed September 8, 1959, now U.S. Patent No. 3,100,803, issued August 13, 1963.

This invention relates to the preparation and production, by the reaction of carbonyl fluoride with fluorine, of perfluorodimethyl peroxide, a compound of the empirical formula, $C_2F_6O_2$. The structural formula probably is $$F_3C-O-O-CF_3$$

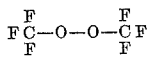

The object of the invention is to provide a good method for producing the compound.

It has heretofore been known that perfluorodimethyl peroxide is produced in small yield by the electrolysis of an aqueous solution containing trifluoroacetate ion [F. Swarts, Bull. soc. chim. Belg., 42, 102 (1933)] but only very small amounts have been obtained. The method is costly because of the low efficiency in utilization of materials. The present invention users materials efficiently and is capable of producing large amounts of perfluorodimethyl peroxide at a much lower cost than was formerly possible.

Perfluorodimethyl peroxide is an oxidizing agent capable of supporting the combustion of hydrocarbons and other fuels. It is of potential value as an oxidant for fuels in rocket propulsion. Since it is a peroxide, it may be expected to be of value for causing polymerization reactions to occur.

The inventors now disclose that perfluorodimethyl peroxide is formed by combining carbonyl fluoride with trifluoromethyl hypofluorite. The reaction may be represented by the equation:

$$CF_3OF + COF_2 \rightarrow CF_3OOCF_3 \qquad (1)$$

They also disclose that the peroxide may be prepared by combining fluorine with carbon monoxide or with carbonyl fluoride. Fluorinating catalysts such as the higher fluorides of metals belonging to the class including $AgF_2$, $CuF_2$, $CoF_3$, $CeF_4$, $HgF_2$, $SbF_5$, $FeF_3$ and $NiF_2$ induce the reaction. In the case of carbonyl fluoride, it is probable that fluorine reacts to give trifluoromethyl hypofluorite as shown in Equation 2

$$COF_2 + F_2 \rightarrow CF_3OF$$

and that the hypofluorite combines with unchanged carbonyl fluoride as shown in Equation 1. When carbon monoxide is used as the starting material, it first reacts with fluorine to give carbonyl fluoride as shown in Equation 3

$$CO + F_2 \rightarrow COF_2 \qquad (3)$$

The carbonyl fluoride may then give perfluorodimethyl peroxide by Reactions 2 and 1. These equations and the theoretical discussion are given at this point to make clear the nature of the invention and to show that the different methods may be regarded as one invention.

The theory permits one to predict that many substances may react with fluorine to give perfluorodimethyl peroxide. Thus, one would expect any substance capable of reacting with fluorine to give carbonyl fluoride to also be capable of giving perfluorodimethyl peroxide. It should be possible to prepare perfluorodimethyl peroxide by the reaction of fluorine with such substances as methanol, ethanol, dimethyl ether, formaldehyde and many other compounds containing carbon and oxygen atoms. Many combinations of reactants should give both carbonyl fluoride and trifluoromethyl hypofluorite. When both of these products are present in a reacting mixture, one may expect to obtain perfluorodimethyl peroxide. Perfluorodimethyl peroxide can be produced by reacting carbon monoxide, carbon dioxide or carbonyl fluoride with either fluorine or trifluoromethyl hypofluorite.

In order that a high yield of perfluorodimethyl peroxide may be obtained by the reaction of fluorine with carbonyl fluoride or carbon monoxide, or by the reaction of carbonyl fluoride with trifluoromethyl hypofluorite, it is necessary that the temperature and the relative proportions of the reactants be held within certain limits. The yield also is dependent upon the length of time allowed for the reaction and upon the presence or absence of a catalyst.

Four different reaction vessels have been used by the inventors to prepare perfluorodimethyl peroxide. Vessel A was a cylindrical container made of nickel. It had a volume of 1.71 liters and it could be heated to any desired temperature by electrical heaters. Its temperature was measured by thermocouples. The reactants were added separately to this vessel and their pressures were measured. As the vessel was heated, the course of a reaction involving a pressure change was followed by measuring the total pressure of the mixture of gases. Samples of gas were sometimes removed from the vessel for identification and analysis.

The second reaction vessel (vessel B) was constructed of copper tubing. It was used to study reactions under conditions of continuous flow. The two gaseous reactants entered (by separate inlets) a cylindrical mixing chamber having an internal diameter of 4.1 cm. and a length of 9.0 cm. They passed through this chamber and then through an electrically heated tube of 89 cm. length and 1.7 cm. internal diameter. When carbon monoxide and fluorine were used as the reactants much heat was liberated in the mixing chamber. If rapid flows of these gases were to be used in a large scale plant, it would be desirable to cool the reactor near the inlets for reactants.

A third reaction vessel (vessel C) was also constructed from copper tubing. It was packed with a tangled mass of copper ribbon of 0.035 cm. width and 0.008 cm. thickness. This ribbon weighed 4500 g. and before use, it was plated with 100 g. of silver. As the result of use, the silver metal became converted to fluorides of silver. The reaction vessel had a length of 90 cm. and an internal diameter of 7.5 cm. It could be heated by passing electricity through coils of resistance wire wound over a layer of asbestos paper surrounding the reactor. There were two heating coils. This made it possible to control the temperature separately in each end of the reactor. At one end of the reactor the two gaseous reactants entered, each by its own inlet, and at the other end the products departed through an outlet.

The fourth reaction vessel (vessel D) was a steel cylinder of the type commonly used to store gases. Its capacity was approximately five liters. Its inner surface was conditioned by long exposure to fluorine; then the cylinder was used in the laboratory as a storage tank for trifluoromethyl hypofluorite, $CF_3OF$.

When using each type of apparatus it was possible to collect samples of the products by condensing them in traps cooled by liquid oxygen. Such samples were analyzed by distillation, the substances being recognized by their boiling points and other properties.

*Example 1.*—Equimolar amounts of trifluoromethyl hypofluorite and carbonyl fluoride were placed in vessel A at 27° C. giving a total pressure of 16.1 cm. of mercury.

The vessel was heated slowly to 287° C. Up to 225° C. the pressure increased in proportion to the absolute temperature, thereby indicating not more than a little combination of the two gases. Above about 235° C. the pressure decreased with rising temperature, thereby indicating that the gases were combining. When the vessel was returned to 27° C. the total pressure of gas was 11.1 cm. of mercury. The remaining gas was found to contain perfluorodimethyl peroxide together with unreacted trifluoromethyl hypofluorite and carbonyl fluoride. The decrease in pressure corresponded to the conversion of 62% of the reactants to perfluorodimethyl peroxide. This experiment showed that the rate of reaction of trifluoromethyl hypofluorite with carbonyl fluoride became appreciable at about 230° C. It also showed that the rate increased with rising temperature above 230° C. (as indicated by an increase in the rate of pressure change). Since the reaction was slow in the neighborhood of 230° C. to 250° C., it follows that the duration of contact of the reactants in a continuous flow reactor at this temperature is important in determining the yield of perfluorodimethyl peroxide.

Vessel A was also used to study the decomposition of perfluorodimethyl peroxide. A sample of the gas was heated slowly to 420° C. At about 225° C. the substance started to decompose, as shown by an abnormally great increase in pressure with temperature. At approximately 325° C. the decomposition was substantially complete. This experiment shows that it is desirable when preparing perfluorodimethyl peroxide to keep the temperature of the reactants as low as possible while still obtaining the desired product. When a continuous flow reactor is used at temperatures above 325° C., one may obtain perfluorodimethyl peroxide, but it is probable that much of the product is formed as the temperature of the gas falls, upon leaving the reactor.

*Example 2.*—Several runs were made using reaction vessel B to determine the effect of temperature and of the relative concentrations of the reactants upon the yield of perfluorodimethyl peroxide. Carbon monoxide entered one inlet and fluorine the other. The total pressure within the system was substantially one atmosphere. The reaction conditions and the yield of perfluorodimethyl peroxide are given in Table 1. The yield of $C_2F_6O_2$ shown in column 5 was calculated from the equation:

$$\text{yield } C_2F_6O_2 = \frac{\text{wt. of carbon in } C_2F_6O_2 \text{ produced}}{\text{wt. of carbon in CO used}} \times 100$$

(3) When the ratio of $F_2$ to CO was greater than 2 to 1, much $CF_3OF$ was formed but little $C_2F_6O_2$ (see Runs 3 and 7). (4) If the ratio of $F_2$ to CO were to be 1 to 1 or less, nearly all of the product probably would be $COF_2$ (see Run 8).

The greatest yield of perfluorodimethyl peroxide obtained from continuous gas streams through vessel B was about 21% of that theoretically possible. The yield was independent of temperature from 307° C. up to the highest temperature used, 405° C. Since Example 1 indicated that the peroxide should not have been obtained above about 325° C., it is likely that the perfluorodimethyl peroxide obtained with vessel B at its higher temperatures was formed as the gas became cooler while passing through the outlet tube leading from the reactor.

Runs 11 and 12 of Table 1 showed that carbonyl fluoride was formed from fluoride and carbon monoxide when the temperature of the reactor was held below about 200° C. but that the formation of perfluorodimethyl peroxide must have been very slow. Unreacted fluorine remained mixed with the carbonyl fluoride. When no electrical heating of the reactor was used, it was possible to tell that the reaction to form carbonyl fluoride occurred in the mixing chamber. This became warm to the touch (perhaps 70° C.) but the tube of 89 cm. length remained at about 25° C. Runs which produced perfluorodimethyl peroxide must have done so by the reaction of carbonyl fluoride with fluorine in the heated tube of vessel B. This series of experiments showed that perfluorodimethyl peroxide was produced by the reaction of fluorine with carbon monoxide or with carbonyl fluoride. The best yields of perfluorodimethyl peroxide resulted from using $COF_2$ and $F_2$ in a volume ratio of 2 to 1 as required by the net equation $$2COF_2 + F_2 = F_3COOCF_3 \tag{5}$$

*Example 3.*—Vessel C was used, the region near the gas inlets being at 75° C. and the region near the outlet being at about 183° C. Fluorine was passed at a rate of 3.25 liters per hour and carbon monoxide at 2.20 liters per hour (each measured at about 25° C. and one atmosphere pressure). The yield of perfluorodimethyl peroxide was about 58% of that theoretically possible from the amount of carbon monoxide consumed. Both carbonyl fluoride and trifluoromethyl hypofluorite were obtained as by-products. In another run in vessel C the top half of the vessel was not heated but the temperature near the outlet was maintained at about 86° C. Rates of flow of gases in liters per

TABLE 1.—PREPARATION OF PERFLUORODIMETHYL PEROXIDE IN VESSEL B

| Run No. | Reactor temp., °C. | Rates of Flow, liters per hour at room temp. and pressure | | Yield, $C_2F_6O_2$, percent | Other products: m=much, l=little |
|---|---|---|---|---|---|
| | | CO | $F_2$ | | |
| 2 | 405 | 2.20 | 3.05 | 21 | m-$COF_2$, m-$CF_3OF$ |
| 3 | 405 | 1.00 | 3.05 | below 1 | m-$CF_3OF$, m-$F_2$ |
| 4 | 400 | 0.90 | 1.55 | 21 | m-$CF_3OF$, m-$COF_2$ |
| 5 | 307 | 2.17 | 3.10 | 17 | m-$CF_3OF$, m-$COF_2$ |
| 6 | 307 | 2.17 | 3.90 | 8 | m-$CF_3OF$, l-$COF_2$ |
| 7 | 307 | 2.10 | 4.30 | trace | m-$CF_3OF$ |
| 8 | 307 | 2.17 | 2.50 | 4 | m-$COF_2$, l-$CF_3OF$ |
| 9 | 307 | 2.20 | 3.20 | 21 | m-$COF_2$, m-$CF_3OF$ |
| 10 | 240 | 2.17 | 3.25 | 10 | m-$COF_2$, l-$CF_3OF$, l-$F_2$ |
| 11 | 200 | 2.20 | 3.25 | below 1 | m-$COF_2$, m-$F_2$, l-$CF_3OF$ |
| 12 [1] | 25 | 0 | 0 | below 1 | m-$COF_2$, m-$F_2$ |

[1] In run 12 the reactor was filled at room temperature by passing $F_2$ and CO at rates of 3.20 l./hr. and 2.15 l./hr. respectively. The gases then stood for 28 hours. At the end of this time the gas contained $COF_2$ and $F_2$. Neither $C_2F_6O_2$ nor $CF_3OF$ were observed to be present in amounts as great as 1% of the total product.

The following conclusions were drawn from the experiments described in Table 1: (1) To obtain perfluorodimethyl peroxide rapidly the temperature of the reactor needed to be greater than 200° C. (2) The best yield of perfluorodimethyl peroxide was obtained with an $F_2$ to CO ratio of 3 to 2. This corresponded to the equation:

$$2CO + 3F_2 = CF_3OOCF_3 \tag{4}$$

hour at 25° C. and one atmosphere were: $F_2$, 3.30; CO, 2.15; $N_2$ (diluent) 4.0. When a sample of the product was distilled $CF_3OOCF_3$ had been produced at a rate of about 2.0 grams per hour. In still another run made in vessel C no electrical heating was used. The temperature near the inlet was about 50° C. and near the outlet was about 27° C. Rates of flow of gases measured in liters per hour at about 25° C. and one atmosphere were: $F_2$, 2.90; CO, 2.15; $N_2$ (diluent), 4.0. When a sample of the product was distilled, no perfluorodimethyl peroxide was found. A small amount probably was present. If so, however, it distilled with the carbonyl fluoride. The gas contained fluorine and much carbonyl fluoride. In the case of this run the gas streams were shut off and the mixture was allowed to stand in the apparatus at about 25° C. for 23 hours. A sample of the gas was then removed. The produce contained $CF_3OF$, $COF_2$ and perfluorodimethyl peroxide approximately in the volume ratio: 2 to 5 to 8 respectively.

The runs in Example 3 showed that the first step in the process was the production of carbonyl fluoride as shown in Equation 3 and that this was followed by additional reactions involving fluorine, to give trifluoromethyl hypofluorite and perfluorodimethyl peroxide. By using vessel C it was possible to produce perfluorodimethyl peroxide at temperatures as low as 25° C. With vessels A and B temperatures near 200° C. or more were required for the reaction to proceed rapidly. It follows that vessel C contained a catalyst for the formation of perfluorodimethyl peroxide and that the catalyst was the tangled mass of copper ribbon bearing a surface layer formed by the fluorination of silver.

*Example 4.*—Trifluoromethyl hypofluorite was stored at room temeprature in vessel D for a period somewhat over one year. At first the gas contained some carbonyl fluoride as an impurity but little or no perfluorodimethyl peroxide was present. At the end of the storage period a part of the gas was condensed and distilled. An appreciable amount of perfluorodimethyl peroxide then was present. This example shows that trifluoromethyl hypofluorite and carbonyl fluoride react even at room temperature to form perfluorodimethyl peroxide. From Examples 1 and 2 it is evident that the reaction at room temperature (about 25° C.) is very slow.

*Summary.*—(1) Perfluorodimethyl peroxide may be obtained in the following ways: (a) combining carbonyl fluoride with trifluoromethyl hypofluorite, (b) combining carbon monoxide with fluorine, (c) combining carbonyl fluoride with fluorine, (d) reacting carbon dioxide with fluorine. Any combination of reactants which forms both carbonyl fluoride and trifluoromethyl hypofluorite should also be capable of forming perfluorodimethyl peroxide.

(2) The preferred proportions of reactants are in each case those required by the stoichiometry of the reactions. A range of concentrations may be used in each case. For carbon monoxide and fluorine it is best that the ratio by volume lie within the limits 1 to 1 up to 1 of CO to 2 of $F_2$. For fluorine and carbonyl fluoride it is desirable that the ratio of $F_2$ to $COF_2$ be less than 1.

(3) In the absence of a catalyst the reaction vessel should preferably be held at a temperature greater than 200° C. The reaction occurs at temperatures as low as 25° C. but it is slow. Even though perfluorodimethyl peroxide decomposes at temperatures below 325° C., it is possible to produce the substance with the reactor (at least in part) at higher temperatures than this. Apparently the upper temperature limit is that at which the rate of corrosion of the reaction by fluoriine becomes large. For a nickel vessel this temperature is about 500° C.

(4) Copper, coated with silver fluoride(s) serves as a catalyst for the preparation of perfluorodimethyl peroxide. When it is present, reaction temperatures as low as 25° C. may be used. Example 4 shows that the catalyst is not necessary, even at temperatures as low as about 25° C. The catlayst can be used over the entire temperature range suitable for the preparation of perfluorodimethyl peroxide. The preferred portion of this temperature range wherein the yield of the product is of desirable magnnitude is from about 80° C. to about 325° C. and it is in that segment of this preferred portion of the temperature range lying between about 80° C. and about 225° C. that the catalyst is very helpful, because below 225° C. the reaction of $CF_3OF$ with $COF_2$ is otherwise undesirably slow. Although the catalyst can be used in the higher segment, from about 225° C. to about 325° C., of the preferred portion of the temperature range, the reaction proceeds in that segment of the temperature range at a practically desirable rate in the asbence of a catalyst, as suggested in (3) immediately above.

Obviously many modifications and variations of the present invention are possible in the light of the above teachings. It is therefore to be understood that within the scope of the appended claims the invention may be practiced otherwise than as specifically described.

What is claimed is:

1. A process of producing perfluorodimethyl peroxide which comprises introducing carbonyl fluoride and fluorine into a reaction zone and reacting them at a temperature of at least 25° C., the volume of carbonyl fluoride used being greater than the volume of fluorine.

2. A process as defined in claim 1 in which the temperature is within the range 225° C. to 325° C.

3. A process as defined in claim 1 wherein there is present a catalyst composed of fluorides of metals selected from the group consisting of silver, copper, cobalt, cerium, mercury, antimony, iron, nickel.

4. A process of producing perfluorodimethyl peroxide which comprises introducing carbonyl fluoride and fluorine into a reaction zone and reacting them in the presence of a catalyst and within the temperature range, 80° C. to 225° C., the volume of carbonyl fluoride being more than 1.33 and less than 4.0 times as great as the volume of fluorine, said catalyst being composed of fluorides of metals selected from the group consisting of silver, copper, cobalt, cerium, mercury, antimony, iron, nickel.

References Cited by the Examiner

UNITED STATES PATENTS 3,100,803  8/1963  Porter et al. _____ 260—610

OTHER REFERENCES

Porter et al., Jour. Amer. Chem. Soc., 79:5628–31 (1957), 4 pp.

LEON ZITVER, *Primary Examiner.*

HAROLD G. MOORE, *Examiner.*